(12) United States Patent
Sousa Vazquez

(10) Patent No.: US 10,752,151 B2
(45) Date of Patent: Aug. 25, 2020

(54) TRANSPORT PLATFORM

(71) Applicant: EFITRANS EFFICIENT LOGISTICS, S.L., Vigo (ES)

(72) Inventor: Jose Alfonso Sousa Vazquez, Vigo (ES)

(73) Assignee: EFITRANS EFFICIENT LOGISTICS, S.L., Vigo (ES)

( * ) Notice: Subject to any disclaimer, the term of this patent is extended or adjusted under 35 U.S.C. 154(b) by 0 days.

(21) Appl. No.: 16/309,329

(22) PCT Filed: Jun. 20, 2017

(86) PCT No.: PCT/ES2017/070447
§ 371 (c)(1),
(2) Date: Dec. 12, 2018

(87) PCT Pub. No.: WO2017/220838
PCT Pub. Date: Dec. 28, 2017

(65) Prior Publication Data
US 2019/0308547 A1    Oct. 10, 2019

(30) Foreign Application Priority Data

Jun. 23, 2016 (ES) .................................. 201630854

(51) Int. Cl.
*B60P 3/08* (2006.01)
*B60P 3/42* (2006.01)
*B61D 3/00* (2006.01)
*B61D 3/18* (2006.01)

(52) U.S. Cl.
CPC .................................. *B60P 3/08* (2013.01); *B60P 3/42* (2013.01); *B61D 3/005* (2013.01); *B61D 3/18* (2013.01)

(58) Field of Classification Search
CPC ..... B60P 3/08; B60P 3/42; B61D 3/18; B61D 3/005
See application file for complete search history.

(56) References Cited

U.S. PATENT DOCUMENTS

| 1,824,370 A | * | 9/1931 | Reid | B60P 3/08 410/13 |
| 1,978,287 A | * | 10/1934 | Thomas | B60P 3/08 410/16 |
| 2,640,562 A | * | 6/1953 | Villars | B66F 7/025 187/214 |

(Continued)

FOREIGN PATENT DOCUMENTS

| CN | 1095024 A | 11/1994 |
| CN | 201040502 Y | 3/2008 |

(Continued)

OTHER PUBLICATIONS

International Search Report dated Dec. 14, 2017 for PCT/ES2017/070447 and English translation.

*Primary Examiner* — Stanton L Krycinski
(74) *Attorney, Agent, or Firm* — Lucas & Mercanti, LLP

(57) ABSTRACT

Transport platform comprising an elevating mechanism where two longitudinal beams (5 and 6) are mounted being positioned at the same height, between which at least a tilting flat structure (8) is mounted, consisting of a telescopic frame formed by two U-shaped rims (16) having the side branches (17) thereof aligned and telescopically related.

11 Claims, 8 Drawing Sheets

(56) References Cited

U.S. PATENT DOCUMENTS

| | | | | |
|---|---|---|---|---|
| 3,104,127 A * | 9/1963 | Swartzwelder | ........... | B60P 3/08 410/29.1 |
| 4,992,013 A | 2/1991 | Westerdale | | |
| 5,040,938 A * | 8/1991 | Gearin | ....... | B60P 3/07 414/400 |
| 5,080,541 A | 1/1992 | Andre | | |
| 5,105,951 A * | 4/1992 | Gearin | ....... | B60P 3/07 211/191 |
| 5,281,075 A * | 1/1994 | Tatman | ....... | B60P 3/08 414/480 |
| 5,286,149 A * | 2/1994 | Seay | ......... | B60P 3/08 187/210 |
| 5,297,908 A * | 3/1994 | Knott | ....... | B66F 7/025 410/26 |
| 5,344,266 A * | 9/1994 | Kolb | ......... | B60P 3/08 410/145 |
| 5,454,672 A * | 10/1995 | Halpin | ...... | B60P 3/08 410/24 |
| 5,567,111 A * | 10/1996 | Gearin | .... | B60P 3/077 410/13 |
| 5,890,855 A * | 4/1999 | Claps | ......... | B60P 3/08 410/24 |
| 6,983,979 B2 * | 1/2006 | Rasmussen | ........... | A47C 17/84 296/156 |
| 9,380,881 B2 * | 7/2016 | Rasmussen | ........... | A47C 19/20 |

FOREIGN PATENT DOCUMENTS

| | | | | |
|---|---|---|---|---|
| CN | 201068303 Y | 6/2008 | | |
| CN | 101318586 A | 12/2008 | | |
| CN | 203497448 U | 3/2014 | | |
| EP | 0208980 A1 | 1/1987 | | |
| EP | 0233004 A2 | 8/1987 | | |
| EP | 0418178 A1 * | 3/1991 | ............... | B60P 3/08 |
| EP | 0595051 A1 | 5/1994 | | |
| EP | 0718149 A1 | 6/1996 | | |
| FR | 1373916 A * | 10/1964 | ............... | B60P 3/08 |
| GB | 1006496 A * | 10/1965 | ............... | B60P 3/08 |
| GB | 1111434 A * | 4/1968 | ............... | B60P 3/08 |
| RU | 2346873 C2 | 11/2007 | | |
| WO | 98/09889 A1 | 3/1998 | | |
| WO | 00/69677 A1 | 11/2000 | | |

* cited by examiner

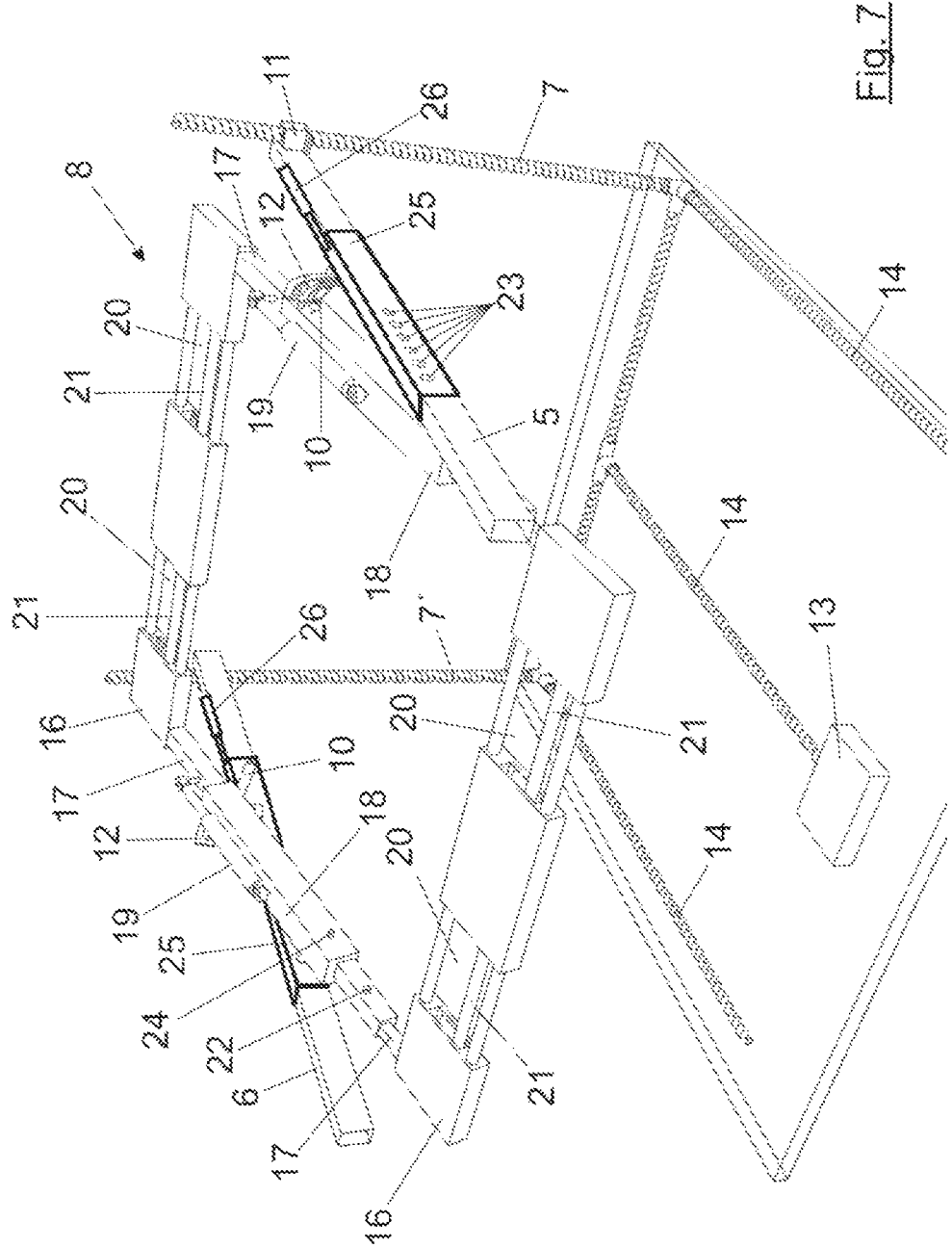

TRANSPORT PLATFORM

CROSS REFERENCE TO RELATED APPLICATION

This Application is a 371 of PCT/ES2017/070447 filed on Jun. 20, 2017, which claims priority of Spanish Application No. P201630854 filed Jun. 23, 2016, both of which are incorporated herein by reference.

FIELD OF THE INVENTION

The present invention refers to a transport platform which can be part of a truck or be intended as an independent platform or trailer, mobile container or swap body for use thereof in transport by road, railway or sea and being provided with means which allow it to be used both for vehicle and for freight transport.

BACKGROUND OF THE INVENTION

Platforms for the transport of vehicles are widely known and used, especially for the transport of vehicles by car and railway. These platforms, being part of a truck or as independent platforms, are provided with structures intended for securely transporting the greatest number of vehicles possible following a one or double-deck design.

These are platforms for the purpose set forth above which use a double-deck design being hydraulically actuated which, in some cases, can be further divided into several parts, so as to have a flexible configuration capable of carrying cars and cargo on the same truck. In this regard, the documents EP0233004A2 and CN203497448U can be mentioned. In this type of devices the platform is not used at its most regarding space, the cars do not tilt and a very big space must be left among cars from different decks since there is a separation deck in between. The configuration and devices disclosed, on the other hand, do not leave room for the side-loading of the truck.

It is also known platforms using a double-deck design or a set of lateral ramps which as well as being hydraulically elevated and lowered, are tilted into sections, also hydraulically. U.S. Pat. No. 4,992,013 and CN201040502Y can be cited as background. The drawbacks are similar to those from the previous case, although less marked. The space in the lorry is not used at its most capacity, and a space has to be left in the middle of the separation deck or a ramp at the wheel zone. As in the previous case, there is no room for the side-loading of the platform.

Lastly, platforms can be cited which use mechanisms that lift each car axle independently, as it is described in CN101318586A, RU2346873C2, CN1095024A and CN2010683031. In this way, a better use of the space is reached by approximating and tilting cars as desired and bringing cars nearer to each other, since the roof top of a car can be nearer the floor of the car being on top without having a separation deck or ramp in between hindering this maximum proximity. This configuration does not leave room for side-loading of the platform and loses load width in many areas of the truck, thus losing cargo capacity when using it as freight transport. The means being used are not easily retractable, so many faults and damage would be produced in said mechanisms when the truck is used for cargo transport. Furthermore, it is not possible to have a double elevator, since the different elevators cannot be interspersed by each axle, so load capacity is lost. It does not allow using the space on top of the truck cabin and also, the feature of independent elevation per axle results in a little robust structure compared to that used in the present invention.

DESCRIPTION OF THE INVENTION

The object of the present invention is a transport platform, being provided with means which allow transformation thereof from a traditional platform for cargo transportation into a traditional platform for the transport of vehicles, said platform thus featuring a double use capability: transport of vehicles and cargo transport.

The present invention thus solves the logistic structural problem of traditional vehicle-carrying truck and vehicle-carrying railway wagon which, since they are means exclusively dedicated to the transport of vehicles, travel half-loaded very often or even unloaded due to the existing unbalanced logistics situation between the big vehicle factories and the big destination areas of the vehicles.

For this purpose, the platform of the invention is provided with the means required for use thereof as a vehicle transport platform, means which are easily retractable, by means of a mechanism which can be actuated by the truck or traction unit driver, so as to be transformed into a traditional platform for the transport of goods, which can be loaded both at the rear and at a side thereof, still keeping the load capacity and the standard measurements of cargo trucks.

The fact that the means allowing vehicles to be carried in the platform of the invention are retractable, and dimensions thereof very reduced, supposes a significant advantage with respect to other solutions, where such means include fixed elements which hinder side-loading and elements which reduce the useful dimensions, thus reducing load capacity when it is to be used as a platform for the transport of goods.

When the platform of the invention is transformed so as to be used for the transport of vehicles, it is provided with means that allow positioning each vehicle to be transported in the appropriate place, regulating its height, longitudinal position in the truck and tilt angle, which together with the fact that the platform is completely hollow, makes it possible to reach the maximum proximity of one vehicle to the other, by approximating the roof of a car to the floor of the car being above it, with distances between vehicles being much lower to those in the platforms intended exclusively for the traditional vehicle transport where there is a separation deck or ramp between the cars which avoids this maximum proximity between vehicles.

This maximum proximity obtained is fundamental for being able to transport two rows of vehicles in a cargo truck; the traditional vehicle-carriers start from a lower height with respect to the ground than the cargo platforms, and in the present invention, with the strategy of a greater proximity of vehicles, it is achieved, starting from a means of transport configured for goods which is higher with respect to the ground, to transport a similar or even bigger amount of vehicles.

In the platform of the invention, the means for the transport of vehicles have a structural design which allows a safe fastening of the vehicle.

As it has been indicated, the platform of the invention can be part of a truck or be an independent platform or trailer, railway or maritime mobile container or swap body being towable by a truck or traction unit.

The platform of the invention comprises at least two longitudinal beams arranged above the platform at the same level or height, each longitudinal beam being mounted on said platform by means of an elevation mechanism which may comprise at least two vertical elevating columns.

The platform may comprise four longitudinal beams arranged in pairs in two levels or decks.

According to a preferred embodiment, the longitudinal beams are mounted on the platform by means of two vertical elevating columns, preferably located to match the ends of the beams and the platform corners.

By means of these vertical elevating columns the beams can be vertically displaced between the upper and lower limit position, in one of which at they are at least retracted, in such a way that both the rear and the side portions of said platform is free of obstacles that may hinder loading on any of these sides.

A flat tilting structure is mounted onto every two longitudinal beams arranged at the same height, by means of cross-sectional aligned rotational shafts, each one of which connects the flat structure to the longitudinal beam of one side.

Furthermore, the flat tilting structure becomes related to the longitudinal beams between which this is mounted by means of an actuator selecting and fixing the angular position of said platform, with respect to the longitudinal beam.

According to a possible embodiment, the elevating mechanism can be provided with elevating vertical columns consisting of vertical spindles, each one of which having at least a threaded element mounted thereon connecting to the longitudinal beams. The spindle rotation over itself causes the vertical displacement of the threaded elements and thereby the vertical displacement of the longitudinal beams.

Preferably, the flat tilting structures will have an adjustable length, with the possibility of being constituted by a telescopic frame, in a parallel direction to the longitudinal beams. This frame may consist of two U-shaped rims, with their side branches being aligned and related by means of a connecting telescopic mechanism.

When the platform includes four longitudinal beams in two levels or heights, at least two spindles per each beam will be used so as to achieve vertical movement of the longitudinal beams, the two upper longitudinal beams being synchronized with each other, since the spindle rotation causing the threaded elements to go up will be coordinated, the same way as the two lower longitudinal beams.

The fact that the whole assembly being anchored to the two longitudinal beams moves vertically at the same time provides consistency, robustness and durability to the system.

BRIEF DESCRIPTION OF THE DRAWINGS

The attached drawings show a non-limiting embodiment, wherein they show:

FIG. 7 a similar view to that of FIG. 2, showing a possible embodiment variant.

DESCRIPTION OF AN EMBODIMENT

Figure 3:
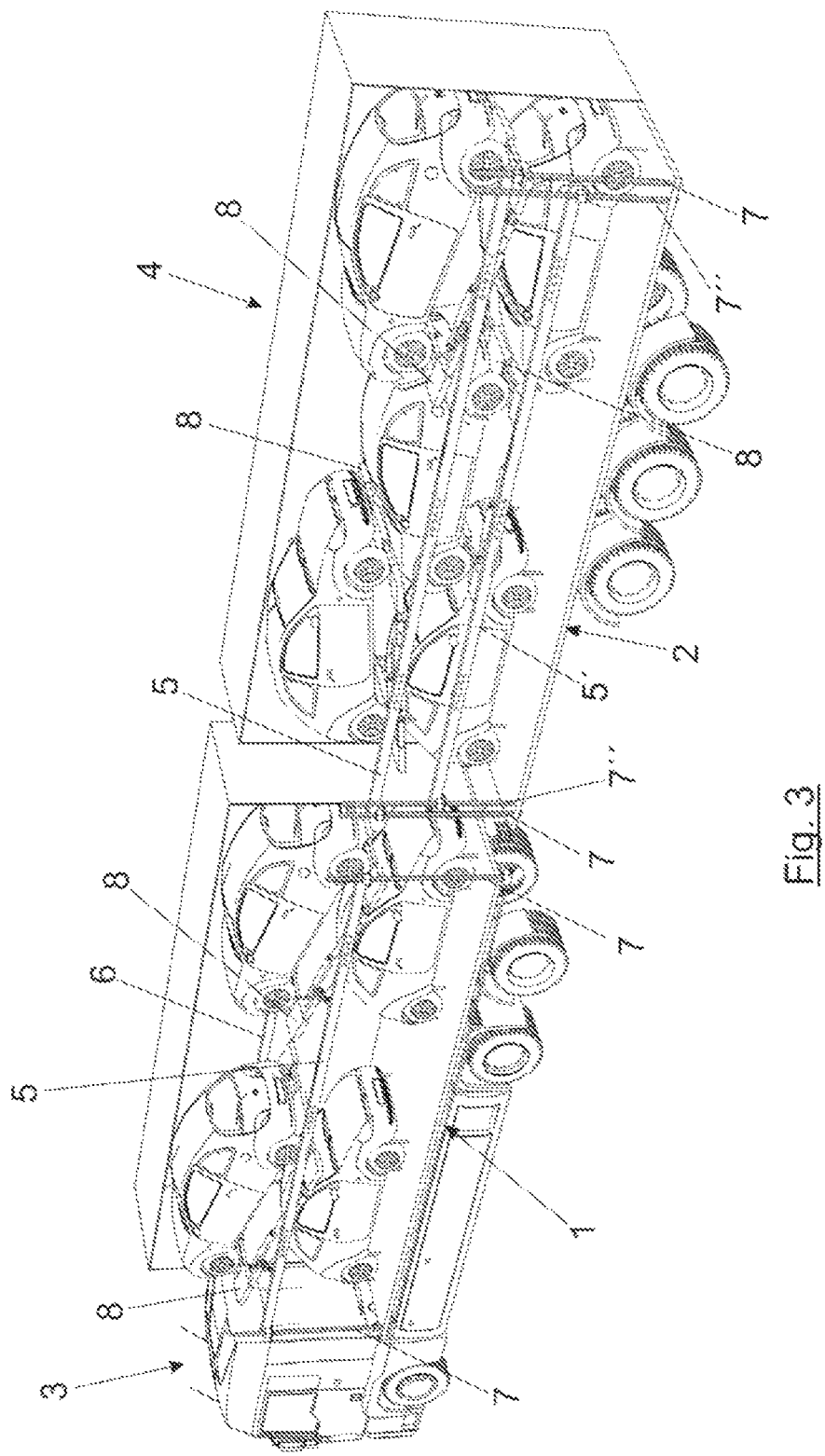
FIG. 3 a perspective view of possible vehicles comprising the platform of the invention.

FIG. 3 shows two cargo platforms (1 and 2) constituted according to the invention, the first of them being part of a truck (3), while the second belongs to a trailer (4).

Figure 1:
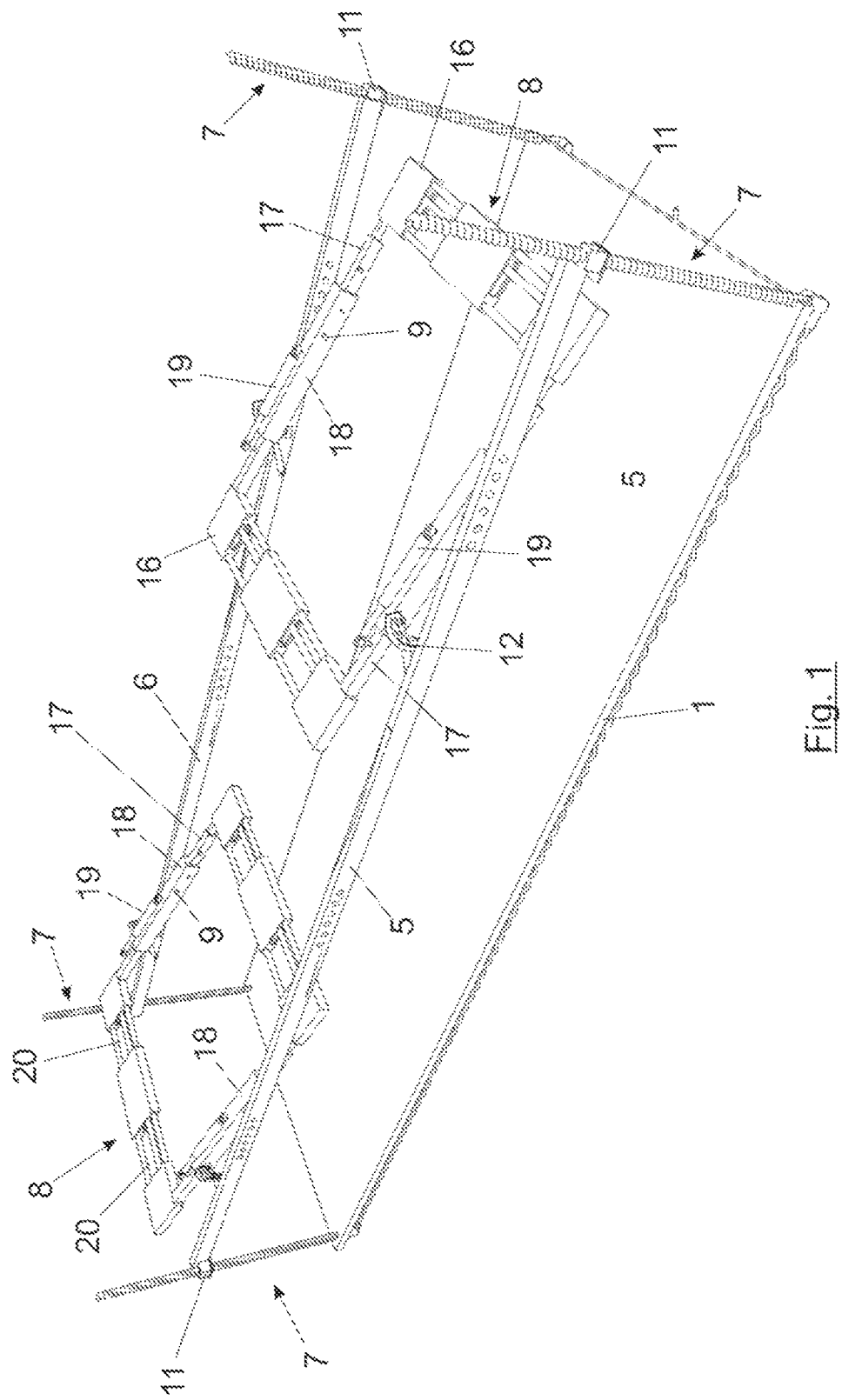
FIG. 1 a perspective view of a platform constituted according to the invention.

The platform (1), FIGS. 1 and 3, comprises two longitudinal beams (5 and 6) being parallel and located at the same height, which are mounted on an elevating mechanism that, in this case, comprises two vertical elevation columns (7). Two tilting flat structures (8) are mounted between every two beams (5 and 6) located at the same height.

The platform (2), FIG. 3, includes two upper longitudinal beams (5 and 6), located at the same height, between which two tilting flat structures (8) are mounted, and two lower longitudinal beams (5" and 6") also located at the same height, between which a single tilting flat structure (8) is mounted.

The elevating vertical columns (7) are arranged to match with the ends of the longitudinal beams (5 and 6) and are as high as the truck or trailer which they are part of.

Figure 6:
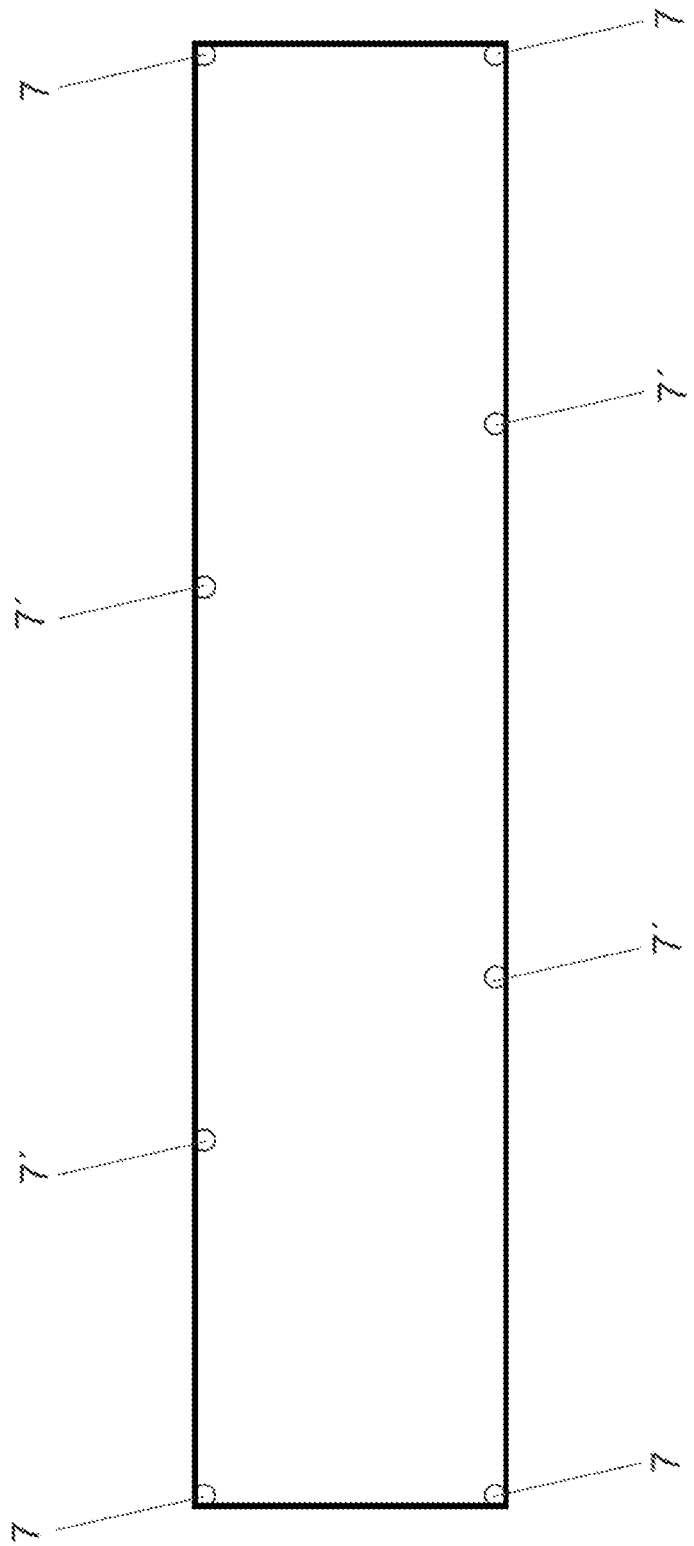
FIG. 6 shows a central schematic view of a non-opposing position of the intermediate spindles.

The platform may include, if necessary, one or more intermediate vertical elevating columns (7"), FIG. 6. In case there are intermediate vertical elevating columns (7') and in order to avoid losing cargo net width in the truck, a possibility is provided for these columns not to be in an opposing arrangement in the truck, but instead being located in non-opposing positions at both sides, as it can be seen in FIG. 6.

Figure 2:
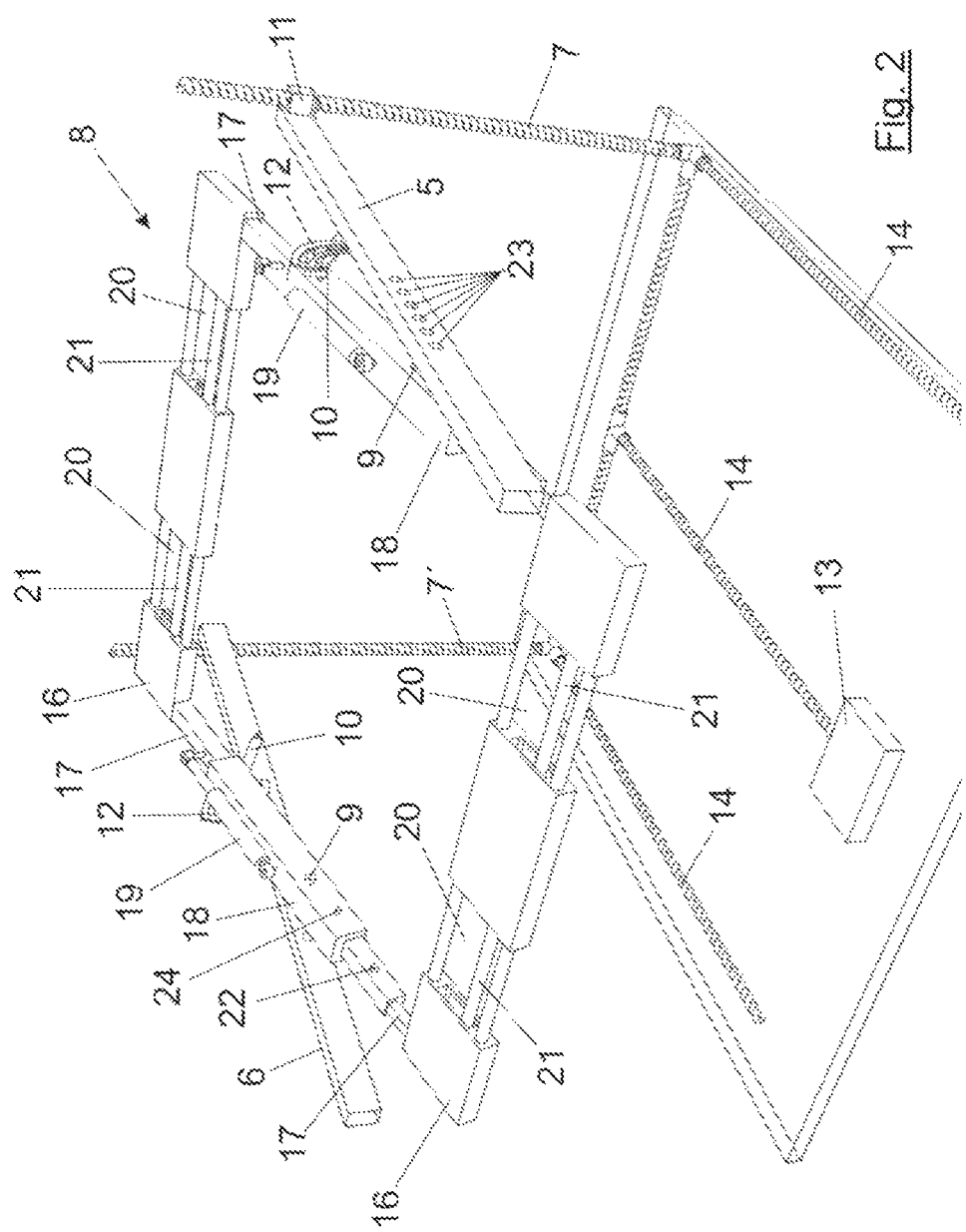
FIG. 2 a partial perspective view of the platform in FIG. 1, at a bigger scale.

As it can be seen in FIGS. 1 and 2, each tilting flat platform (8) is mounted between two beams (5 and 6) by means of two aligned cross-sectional shafts (9) and is also related to said beams by means of an actuator (10), for example, of an hydraulic type. Activation of this actuator causes tilting of the tilting flat structure (8) until reaching the desired position in each case.

In FIG. 3, in the trailer (4) it can be seen that the actuator (10) that fixes the tilting flat structure (8) allows fixing said inclination by rotating said structure (8) both clockwise and anti-clockwise, so as to adjust to the different nature of the cargo and the different dimensions of the vehicles in each case.

The elevating vertical columns (7) consist of, in the depicted example, vertical spindles, FIGS. 1 and 2, where threaded elements (11) are mounted. Rotation of the spindles of the columns (7) over themselves will cause the threaded elements (11) to go up or down. In the platform (2), FIG. 3, the upper longitudinal beams (5 and 6) are coupled, by means of at least four threaded elements (11), to the spindles of the columns (7) and the other lower longitudinal beams (5' and 6') are also coupled, by means of at least other four threaded elements (11), to the spindles of another independent set of columns (7") and being parallel to columns (7) of the upper platform.

As safety means, between each tilting flat structure (8) and the longitudinal beams (5 and 6), an arc (12) can be arranged, FIG. 2, limiting the maximum tilting angle of said structures.

The threaded elements displacement (11) supporting the beams (5-6) located at the same height will be synchronized, for example, by means of the action of a single motor (13), FIGS. 2 and 7, situated under the transport platform so as not to take cargo capacity away, FIG. 1. Through the transmission bars (14) a mechanical coupling can be achieved causing rotation of all the spindles over themselves at the same time.

The tilting flat structures (8) are constituted, FIG. 2, by a frame configured as a telescopic frame comprising two U-shaped rims (16) having the side branches (17) thereof aligned and connected by means of a telescopic mechanism consisting of, for example, an intermediate tubular profile (18), through which the aligned side branches (17) go, and an actuator, for example, of the hydraulic type. The tubular profile (18) is mounted on the longitudinal beams (5-6) through the shaft (9) holding the tubular profile (18) at the outer area thereof, so as to allow the branches (17) slide along said tubular profile by means of an actuator (19), for example of the hydraulic type, in order to longitudinally displace the flat structures, with respect to the longitudinal beams (5-6). The rims (16) are provided with cavities (20) for fitting the wheels of the vehicles to be transported, said cavities which may include at least a bar (21) featuring an adjustable position, FIG. 2, that will be fixed in the required position so as to adapt to the different wheel dimensions of the different cars.

Side telescopic branches (17) will adapt, manually or automatically, to the distance between the axles of the vehicle to be supported. Once the vehicle is placed therein, it will be fixed by means of a bolt (22), FIG. 2, to fix the telescopic movement of the side branches (17).

Once the telescopic movement of the side branches (17) is fixed, the actuator (19) acts by driving the side branches (17) so as to slide along the tubular profile (18) which is fixed to the longitudinal beams (5 and 6) through the shaft (9), so the platform is longitudinally relocated in the truck forwardly or backwardly up to the limit reaching the length of the actuator (19). Finally, by means of the actuator (10) and arc (12), FIG. 2, the angular position of the flat structures is fixed.

As it can be seen in FIG. 2, the longitudinal beams (5 and 6) are provided with several orifices (23), FIG. 2, with the object of obtaining an additional adjustment of the longitudinal position of the platforms (8). These orifices (23) are aligned in both beams and between two of them, aligned, the cross-sectional shafts (9) are mounted, allowing re-location of the shaft (9) of the platforms (8) along the longitudinal beams (5 and 6) depending on the dimensions of the vehicles to be transported. Changing the orifice (23) of the tilting flat structure (8) must be done manually in this case when the platforms are at the truck base before the vehicle loading process.

Figure 7A:
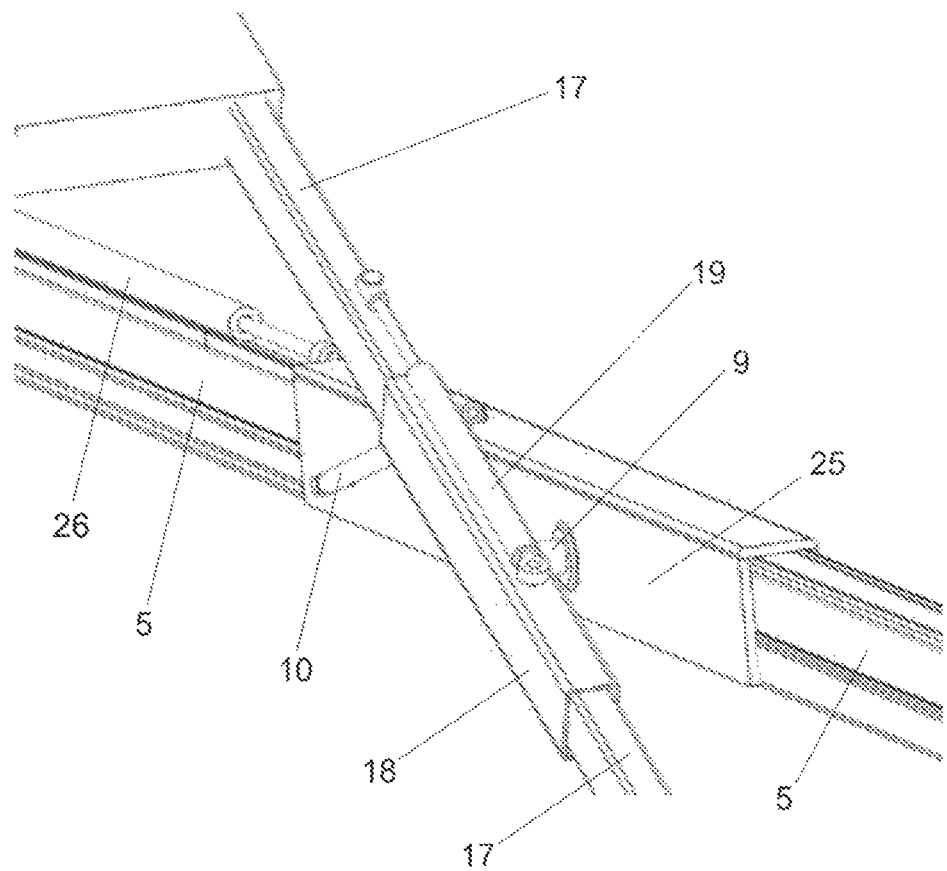
FIG. 7A shows a detail of a possible embodiment variant similar to that of FIG. 7.

In order to perform this movement along the longitudinal beams (5 and 6) automatically, a carriage (25) having bearings has been provided which works as a displacement means for the rotation shaft (9) of at least one of the tilting structures. The shaft (9) and an end of the actuator (10) are mounted onto said carriage (25), as it is shown in FIG. 7. This carriage (25) with bearings would displace along the longitudinal beams (5 and 6) being driven by an actuator (26) which could be of the hydraulic type, this detail being seen in further detail in FIG. 7A. Concretely, FIG. 7A shows a carriage (25) being provided with a number of bearings in order to allow displacement of the carriage (25) and therefore displacement of the cross-sectional shaft (9), in different positions along the longitudinal beam (5). In a particularly preferred embodiment, the cross-sectional shaft (9) is in the vicinity of middle of the tilting structure of the platform, that is, away from the ends. Additionally, blocking the carriage (25) movement can be achieved by means of bolting as it can be seen in FIG. 7, or by blocking the actuator (26) in a fixed position.

Figure 4:
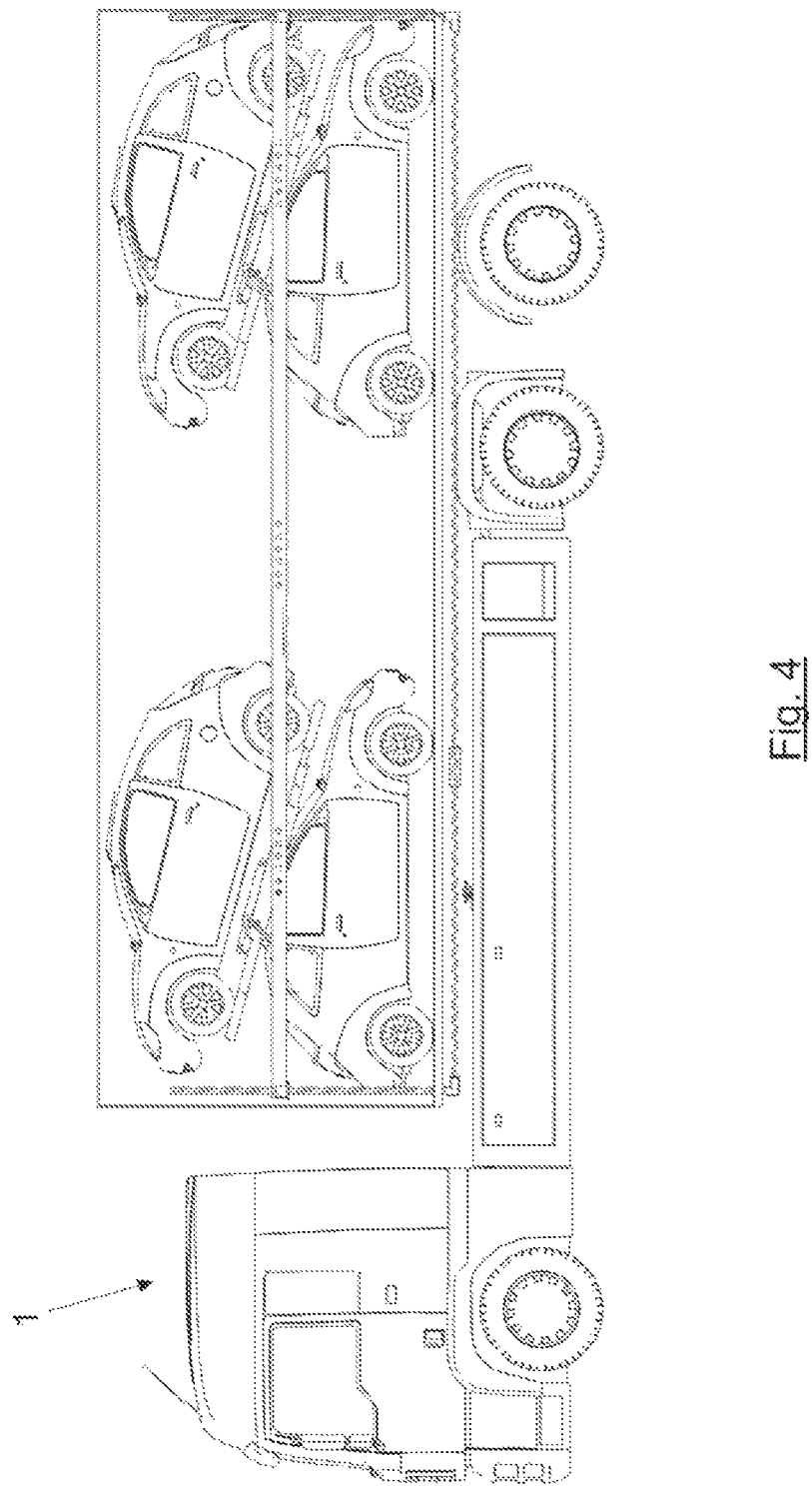
FIG. 4 shows a side elevation view of the truck in FIG. 3 at a bigger scale.

The space delimited between every two U-shaped rims (16) of the tilting flat structures will allow a maximum proximity of the vehicles to be transported, thus allowing approximating the roof top of a vehicle to the bottom of the one being on top, and thus reducing the height at a maximum grade and transporting two rows of vehicles in a cargo truck as it is depicted in the embodiment of FIG. 4.

When it is not necessary to adjust or vary the length of the tilting flat structures (8), said structures can be constituted by a fixed rectangular frame.

Figure 5:
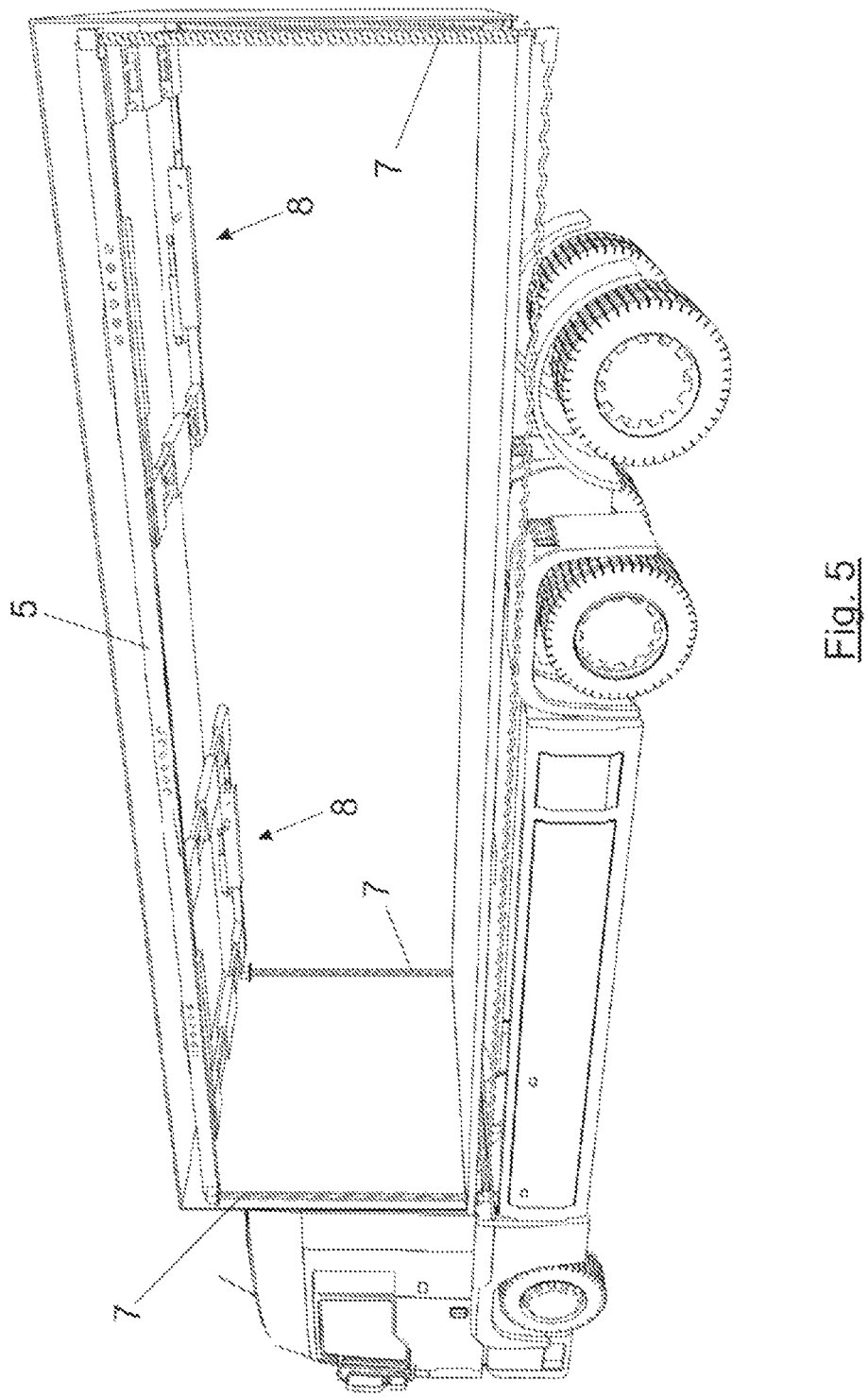
FIG. 5 a perspective view of a transport platform being retracted.

Through the platform of the invention, for use thereof in cargo transportation, the longitudinal beams (5 and 6) and the tilting flat structures (8) are displaced until reaching its highest position and are located in a totally horizontal position so as to occupy the minimum space, with the platform thus becoming free for rear or side loading thereof, as it is shown in FIG. 5. Also, the longitudinal beams (5 and 6) and the tilting flat structures (8) can be displaced up to the platform surface and by means of coverings can create a continuous load surface.

When the platform is used for the transport of vehicles, at the moment these are loaded, the platform is presented having the flat structures on said platform floor by displaying ramps, at the rear part of said platform, allowing lifting the vehicles.

The length of each flat structure is adjusted to the distance between the car axles, and once said length is adjusted bolts (22) are provided, FIG. 2, so as to secure the selected length and then the loading of vehicles is carried out with, after which the wheels are fastened with slings.

Then, the vehicles loaded in the upper level structures are lifted, so that the vehicles of the lower deck can be loaded. In order to elevate the vehicles of the upper deck and for them not to touch the roof top, the roofs will have to be provided with independent telescopic mechanisms which allow said action. Once the cars from the lower area are positioned and fastened with slings, the height of the upper level is adjusted, as well as the angle of the tilting flat structures by actuating the actuator (10) and adjusting the longitudinal position by means of the actuator (19), and the selected positions are fixed by means of pins (24) and the arc (12), FIG. 2.

For unloading the cars these operations are carried out inversely.

For a maximum use of the space, both the roof tops and the front and rear doors of the trucks, trailers or swap bodies are intended so that they can be eventually made of canvas which can be rolled up so that the transport can take place having one of these parts open and thus being able to take the cars up to the end of the means of transport with the purpose of maximizing both the net height and length.

The invention claimed is:
1. A transport platform, comprising
   at least two upper longitudinal beams arranged at the same level or height, which are mounted on an elevating mechanism,
   a plurality of tilting flat structures which are mounted between the two longitudinal beams of the same level, by means of cross-sectional aligned rotation shafts, each of the plurality of tilting flat structures are connected to said beams by means of an actuator capable of adjusting and fixing the inclination of said plurality of tilting flat structures, and carriages arranged on the longitudinal beams in which the shafts are mounted for displacing the tilting flat structures along the longitudinal beams, wherein the rotation shafts and an end of the actuator are mounted onto the carriage, the carriages being connected to an actuator for displacement thereof along said beams.

2. The transport platform according to claim 1, wherein the elevating mechanism is provided with vertical elevating columns consisting of vertical spindles which can rotate over themselves, in each of which at least a threaded element is mounted, being each longitudinal beam mounted between at least two threaded elements of the spindles forming the elevating columns of the same side of the platform.

3. The transport platform according to claim 1, wherein each of the plurality of the tilting flat structures consists of a telescopic frame, in a direction being parallel to the longitudinal beams, the telescopic frame comprising two U-shaped rims having side branches, each one of the side branches connected by a telescopic mechanism, and wherein each of the plurality of the tilting flat structures is provided with cavities for fitting the wheels of the vehicles to be transported.

4. The transport platform according to claim 3, wherein the cavities for fitting the wheels of the vehicles to be transported, are provided with at least an adjustable position bar.

5. The transport platform according to claim 3, wherein the telescopic mechanism comprises a tubular profile through which an aligned side branch is inserted and an actuator to allow the aligned side branch slide along said tubular profile; and wherein the tubular profile is mounted on the longitudinal beams through the rotation shaft which holds the tubular profile.

6. The transport platform according to claim 1, wherein the longitudinal beams are provided with intermediate horizontal passages aligned in both beams, with the cross-sectional rotation shafts being mounted between two of said aligned passages through which the plurality of tilting flat structures are mounted in said beams.

7. The transport platform according to claim 1, wherein an arc is arranged between the plurality of tilting flat structures and the beams, the arc limiting a maximum tilting angle of said plurality of tilting flat structures.

8. The transport platform according to claim 1, wherein the two upper longitudinal beams are coupled by means of at least four threaded elements in the elevating mechanism, provided with spindles forming a first set of columns, and the transport platform further comprising two lower longitudinal beams coupled by means of at least other four threaded elements mounted in the spindles forming a second set of columns, independent from the first set of columns.

9. The transport platform according to claim 2, wherein the longitudinal beams are mounted on the vertical elevating columns and are actuated in a synchronized manner.

10. The transport platform according to claim 9, wherein intermediate columns are positioned between the vertical elevating columns at both sides of the platform.

11. The transport platform, according to claim 1 wherein the rotation shaft is arranged in the vicinity of the middle of the tilting flat structure.

* * * * *